United States Patent [19]

Morris et al.

[11] Patent Number: 5,467,960
[45] Date of Patent: Nov. 21, 1995

[54] TWO-WAY HVAC FLUID CONTROL VALVE

[75] Inventors: John M. Morris, Auburn; Charles J. Green, Seattle, both of Wash.

[73] Assignee: GT Development Corporation, Tukwila, Wash.

[21] Appl. No.: 264,031

[22] Filed: Jun. 22, 1994

[51] Int. Cl.$^6$ .................... F16K 31/02; F16K 31/126
[52] U.S. Cl. .................. 251/30.01; 251/129.02; 251/331
[58] Field of Search ............... 251/30.01, 129.02, 251/30.02, 30.03, 331, 129.01; 137/544, 550

[56] References Cited

U.S. PATENT DOCUMENTS

| | | | |
|---|---|---|---|
| 2,282,878 | 5/1942 | Newton | 251/30.01 X |
| 2,412,490 | 12/1946 | Biggle | 251/30.02 X |
| 2,899,972 | 8/1959 | Matthews | 251/30.02 X |
| 3,263,693 | 8/1966 | Ages | 251/30.02 X |
| 3,981,478 | 9/1976 | Lundsgart | 251/30.02 X |
| 5,195,718 | 3/1993 | May | 251/30.02 |

OTHER PUBLICATIONS

G. M. Rolling et al., "Air Mix versus Coolant Flow to Control Discharge Air Temperature in Vehicle Heating and Air Conditioning Systems", *Publication Unknown, Date Unknown.*

*Primary Examiner*—Martin P. Schwadron
*Assistant Examiner*—Kevin L. Lee
*Attorney, Agent, or Firm*—Christensen, O'Connor, Johnson & Kindness

[57] ABSTRACT

A two-way fluid control valve for use in temperature controlled HVAC systems. The control valve includes an engine coolant inlet and an engine coolant outlet. A diaphragm is located between the inlet and outlet and is movable between a closed position in which it prevents coolant flow through the control valve and an open position in which it allows coolant to flow through the control valve. A pressure chamber above the diaphragm is in fluid connection with the common port of a three-way control solenoid. The inlet is in fluid connection with the normally closed port of the solenoid and the outlet is in fluid connection with the normally open port of the solenoid. In an unenergized position, the pressure chamber is maintained at a lower pressure than the coolant pressure in the outlet, allowing the diaphragm to be forced open by the engine coolant, thus allowing engine coolant to flow through the valve. In an energized mode, the pressure chamber is maintained at the same pressure as the inlet, thus allowing a spring to bias the diaphragm into a closed position in which engine coolant is prevented from flowing through the valve.

10 Claims, 8 Drawing Sheets

TWO-WAY HVAC FLUID CONTROL VALVE

FIELD OF THE INVENTION

The present invention relates to temperature controlled heating, ventilation and air-conditioning (HVAC) units and, more specifically, to fluid valves used in HVAC systems.

BACKGROUND OF THE INVENTION

There are two common methods of controlling the temperature of air discharged from a temperature controlled heating, ventilation and air-conditioning (HVAC) unit used in vehicles such as passenger cars and trucks and commercial trucks and vehicles. In the first method, commonly referred to as air mix systems, engine coolant is continuously circulated through a heater core connected to the vehicles engine. The air temperature discharged from the HVAC unit is controlled by directing a portion of the total system airflow coming from the air-conditioning evaporator core through the heater core. The volume of air passing through the heater core is mixed with the volume of air bypassing the heater core to obtain the desired air temperature. The volume of air flowing through the heater core and thus the discharge air temperature is controlled by adjusting the position of an air mix door that regulates the volume of air flowing through the heater core.

In the full cold position, the air mix door directs all of the airflow to bypass the heater core, thus producing the coldest discharge air temperatures. In the full hot position, the air mix door directs all of the airflow to pass through the heater core, thus producing the hottest discharge air temperature. In intermediate positions, varying volumes of airflow are directed through the heater core to achieve the desired discharge air temperature.

In the second type of HVAC unit, commonly referred to as a fluid controlled system, the entire volume of air flowing through the air-conditioning evaporator is passed through the heater core. The temperature of the air discharged from the HVAC unit is controlled by regulating the volume of engine coolant passing through the heater core, thus regulating the temperature of the heater core. The volume of engine coolant supplied to the heater core is controlled by a temperature regulated fluid control valve.

In the full cold position, the fluid control valve prevents any engine coolant from flowing through the heater core, producing the coldest temperature, while in the full hot position, the fluid control valve allows a continuous volume of engine coolant to flow through the heater core, producing the hottest temperature. To obtain intermediate discharge air temperatures the fluid control valve is opened or closed for differing periods of time to regulate the volume of engine coolant passing through the heater core, thereby regulating the temperature of the heater core and discharge air.

Both air mix and fluid controlled HVAC units have attendant advantages and disadvantages. Properly designed air mix HVAC units can produce changes in the system discharge air temperature faster than fluid controlled HVAC units of similar size. Air mix HVAC units also produce greater volumes of air because all the air volume does not pass through the flow restrictive heater core. However, properly designed air mix HVAC units are more difficult to design and build and create dimensional restraints on the size and placement of system components. Fluid controlled HVAC units produce changes in discharge air temperature slower than air mix HVAC units but are simpler to design and allow a greater range of component placement while still producing an effective HVAC system.

The fluid control valves used in current fluid controlled HVAC units are complex, expensive to produce, and prone to maintenance problems. These problems have been most prevalent in larger HVAC units that operate under greater system pressures and higher coolant volumes, for example, HVAC units on commercial trucks, buses, etc.

Thus, there exists a need for a fluid control valve that reduces or eliminates the problems of prior HVAC fluid control values. Specifically, such a fluid control valve should reduce the complexity, maintenance, and possibly cost of the control valves.

SUMMARY OF THE INVENTION

In accordance with the invention, a two-way fluid control valve for use in temperature controlled HVAC units is provided. The fluid control valve includes a fluid inlet and a fluid outlet. A valve member is located between the fluid inlet and fluid outlet and is movable between a closed position in which the valve member prevents coolant flow through the valve and an open position in which the valve member allows coolant flow through the valve. A three-way solenoid controls the movement of the valve member between the open and closed positions. The solenoid includes a normally closed port, a normally open port, and a common port. The fluid inlet is in fluid connection with either the normally closed port or the normally open port while the fluid outlet is in fluid connection with the other port. The valve member is in fluid connection with a common port.

A pressure chamber located above the valve member is in fluid contact with the common port. When the common port and thus pressure chamber is in fluid connection with the inlet, the pressure chamber is maintained at the same pressure as the inlet. Because the inlet and the pressure chamber are at the same pressure, there is no pressure differential across the valve member allowing the valve member to be biased into a closed position by a biasing member. When the pressure chamber is in fluid connection with the outlet, it is at the same pressure as the outlet. Because the inlet is at a higher pressure than the outlet, this creates a pressure differential across the valve member. The pressure differential across the valve member opens the valve member and allows fluid to flow through the two-way fluid control valve. Whether the pressure chamber is in fluid connection with the inlet or the outlet is controlled by the solenoid.

In accordance with other aspects of the invention, the valve member is a flexible diaphragm. A pressure chamber above the diaphragm is in fluid connection with the common port of the solenoid. A spring is also located above the diaphragm and biases the diaphragm into the closed position, preventing fluid flow between the fluid inlet and the fluid outlet.

In accordance with other aspects of the invention, when the solenoid is unenergized, the valve member is in the open position, allowing fluid to flow between the fluid inlet and the fluid outlet. In the open position, the pressure chamber above the valve member is maintained at a lower pressure than the pressure in the fluid inlet thus allowing fluid to force the valve member open, against the pressure of the spring. When the solenoid is energized, the valve member moves to the closed position and prevents flow between the fluid inlet and fluid outlet. The valve member is moved to the closed position by maintaining the pressure chamber above the valve member at the same pressure as fluid in the inlet, thus allowing the biasing force of the spring to force the diaphragm into the closed position.

The two-way fluid control valve of the invention has a number of advantages over prior fluid control valves. First, the valve contains few moving pans and is relatively maintenance-free. Preferably, the two-way fluid control valve has relatively large passages between the fluid inlet, fluid outlet, pressure chamber, and solenoid assembly. The relatively large passages allow the pressure in the pressure chamber to be changed rapidly, allowing the valve member to be quickly moved between its open and closed positions, thus decreasing the HVAC system response time. Preferably, the diaphragm has a large surface area, which allows the valve to be responsive to small pressure differentials between the fluid inlet and the fluid outlet. Because the two-way fluid control valve is also electrically controlled, it eliminates the need for expensive and complex air ducting used in many vehicle valve applications.

BRIEF DESCRIPTION OF THE INVENTION

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
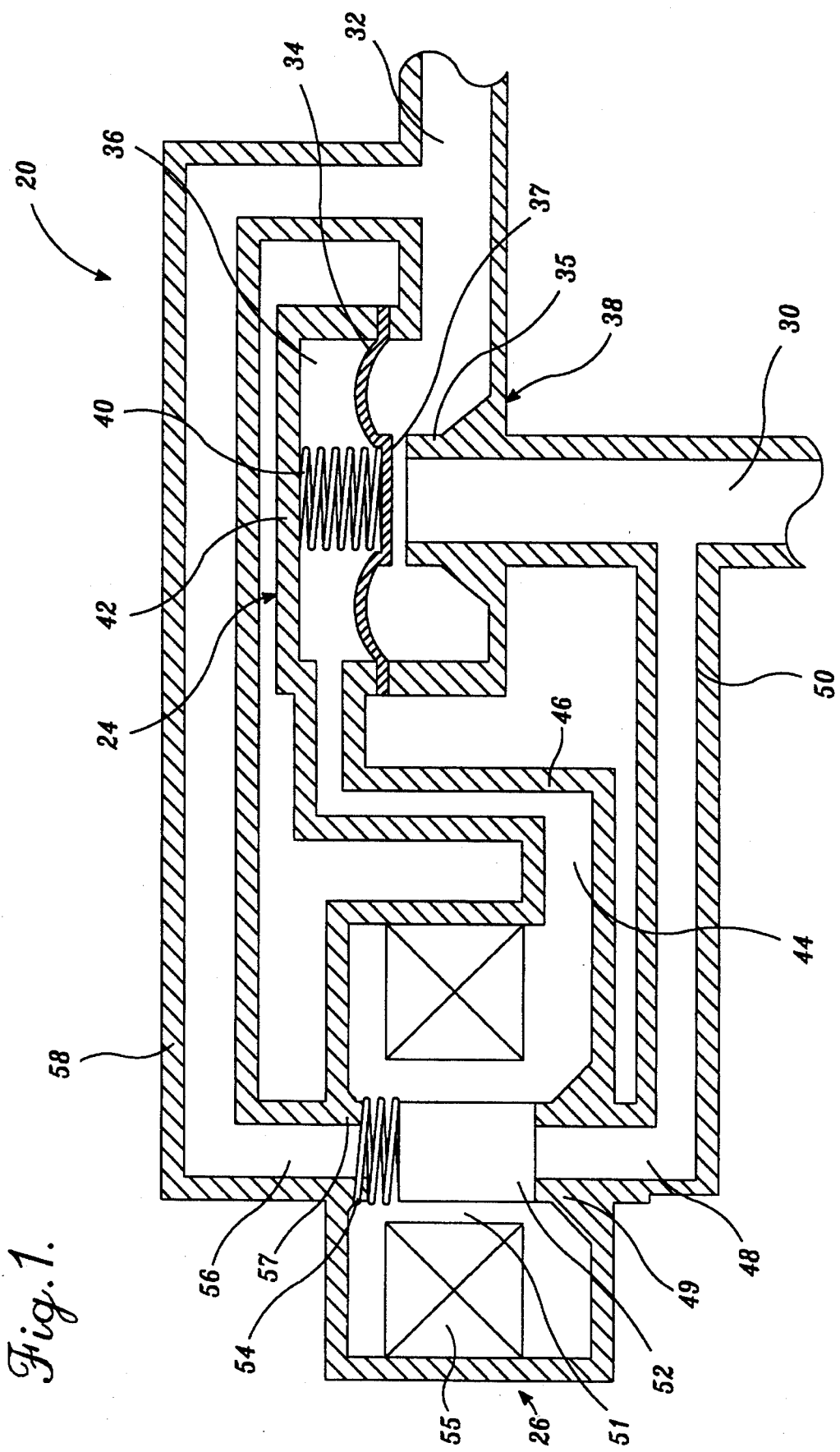
FIG. 1 is a schematic representation showing the basic operation of a two-way fluid control valve formed in accordance with this invention.

The invention is a two-way fluid control valve for use in temperature-controlled HVAC unfits. The control valve is located in the HVAC coolant hose extending between the engine and the heater core (not shown). Elevated temperature engine coolant flows from the engine, through the control valve, and then into the HVAC heater core. The general operation of the invention will first be explained by reference to a schematic representation illustrated in FIG. 1. The pans of the control valve are first set forth, followed by a description of the operation of the control valve. The two-way fluid control valve generally designated 20 includes a valving assembly 24 that controls the fluid flow through the control valve and a three-way solenoid assembly 26 that controls the operation of the valving assembly.

The valving assembly 24 includes a fluid inlet 30 through which elevated temperature engine coolant enters the control valve 20 and a fluid outlet 32 through which engine coolant exits the control valve. The flow of engine coolant through the valving assembly 24 is regulated by a valve member formed by a diaphragm 34 that is disposed between the fluid inlet 30 and the fluid outlet 32.

The diaphragm 34 is supported around its periphery. The bottom of the diaphragm is supported by a lower housing 38 and the top of the diaphragm is supported by an upper housing 42. The upper surface of the diaphragm 34 and lower surface of the upper housing 42 form a sealed pressure chamber 36 above the diaphragm. The bottom surface of the center section 37 of the diaphragm is aligned with a diaphragm seat 35 located about the periphery of the end of the fluid inlet 30. Movement of engine coolant through the control valve 20 is prevented when the diaphragm contacts and forms a fluid seal with the diaphragm seat 35. The diaphragm 34 is shown in the open position in FIG. 1. In this position, the engine coolant is allowed to flow from the fluid inlet 30, through the control valve 20 to the fluid outlet 32, as described below. The diaphragm 34 is biased toward the closed position in which it forms a seal with the diaphragm seat 35 by a coil spring 40 that extends between the center of the diaphragm 34 and the facing surface of the upper housing 42.

The operation of the valving assembly 24 is based on the principle that when the fluid pressure within the pressure chamber 36 above the diaphragm 34, is the same or greater than the fluid pressure within the fluid inlet 30, the biasing force produced by the coil spring 40 is adequate to seal the diaphragm 34 against the diaphragm seat 35. If the fluid pressure in the fluid inlet 30 is greater than the fluid pressure in the pressure chamber 36 by an amount that is sufficient to overcome the biasing force of the coil spring 40, the diaphragm 34 is forced away from the diaphragm seat 35 as shown in FIG. 1. As the diaphragm 34 moves away, engine coolant is free to flow from the fluid inlet 30, over the diaphragm seat 35 and out of the control valve 20 through fluid outlet 32.

The movement of the diaphragm between the open and closed positions is controlled by regulating the pressure in the pressure chamber 36. The pressure within the pressure chamber 36 is regulated by the solenoid assembly 26. The control valve 20 is referred to as a two-way control valve due to its use of a three-way solenoid assembly 26 having three separate ports referred to as the common port 44, the normally closed port 48, and the normally open port 56.

The normally closed port 48 is closed by a valve member 52 that is biased against the seat 49 of the normally closed port by a coil spring 54. The coil spring 54 extends between the surface of the valve member 52 remote from the seat 49 of the normally closed port 49 and the seat 57 of the normally open port 56. The valve member 52 forms the movable element of the solenoid assembly 26, which also includes a coil 55. When the coil 55 of the solenoid assembly 26 is not energized (as shown in FIG. 1), the normally open port is open to fluid flow because the coil spring 54 biases the valve member 52 away from the seat 57 of the normally open port and against the seat 49 of the normally closed port. When the coil 55 is energized, the normally open port is closed to fluid flow because the magnetic field produced by the coil presses the valve member against the seat 57 of the normally open port 56, compressing the coil spring 54. When this occurs, the normally closed port is opened.

The common port 44 is in fluid communication with the normally open port 56 when the solenoid assembly 26 is not energized and is in fluid connection with the normally closed port 48 when the solenoid assembly 26 is energized. More specifically, the common port 44 is in fluid communication with a chamber 51 that surrounds the valve member 52. The chamber 51 is in fluid communication with either the normally open port 56 or the normally closed port 48 depending upon whether the solenoid assembly 26 is energized or de-energized.

The solenoid assembly 26 and valving assembly 24 are connected as follows: the fluid inlet 30 is connected to the normally closed port 48 by a passageway 50; the fluid outlet 32 is connected to the normally open port 56 by a passage 58; and the common port 44 is connected to the pressure chamber 36 by a passageway 46.

As noted above, when the coil 55 of the solenoid assembly 26 is not energized, the normally closed port 48 is closed and the normally open port 56 is open. As a result, the pressure chamber 36 is in fluid connection with the fluid outlet 32. Because the fluid outlet 32 is downstream in the coolant flow direction, the pressure in the fluid outlet and thus pressure chamber 36 is less than the pressure in the fluid inlet 30. The pressure differential between the pressure in the fluid inlet 30 and the pressure in the pressure chamber 36 adequate to overcome the strength of the coil spring 42 and move the diaphragm 34 away from the diaphragm seat 35 (FIG. 1), allowing engine coolant to flow over the diaphragm seat 35 and out the fluid outlet 32.

When the coil 55 of the solenoid assembly 26 is energized, the valve member 52 is moved toward the seat 57 of the normally open port 56, opening the normally closed port 48. When the valve member contacts the open port seat 57, the normally open port 56 is closed. Opening the normally closed port 48 results in the pressure chamber 36 being fluid connected to the fluid inlet 30. As a result, the pressure in the pressure chamber 36 is substantially the same as the pressure in the fluid inlet 30. Because there is no pressure differential across the diaphragm 34, the biasing force produced by the coil spring 40 forces the diaphragm into contact with the diaphragm seat 35 to form a fluid seal that prevents engine coolant from flowing through the control valve 20.

The two-way valve schematically represented in FIG. 1 allows engine coolant to flow continuously through the control valve 20 when the solenoid assembly 26 is not energized, thus making the HVAC unit's default position the hottest discharge air temperature. An HVAC unit that defaults to the full hot position if electrical power is lost is generally preferred to ensure that in cold weather a vehicle's occupant will not be without heat in case of an electrical failure. In other applications it may be beneficial for the HVAC unit to have a default position in which the HVAC system defaults to the full cold position if electrical power is lost. The control valve 20 can be configured to default to a closed position by connecting the outlet 32 to the normally closed port 48 and the inlet 30 to the normally open port 56.

The two-way fluid control valve 20 of the invention has a number of advantages over prior HVAC fluid control valves. First, the two-way fluid control valve 20 contains few moving pans and is thus relatively maintenance-free. The two-way fluid control valve 20 also has relatively large passages between the inlet 30, the outlet 32, the pressure chamber 36, and the solenoid assembly 26. Large passages allow the pressure in the pressure chamber 26 to be rapidly changed, which allows the valve 20 to respond quickly to requests for changes in engine coolant flow.

Figure 2:
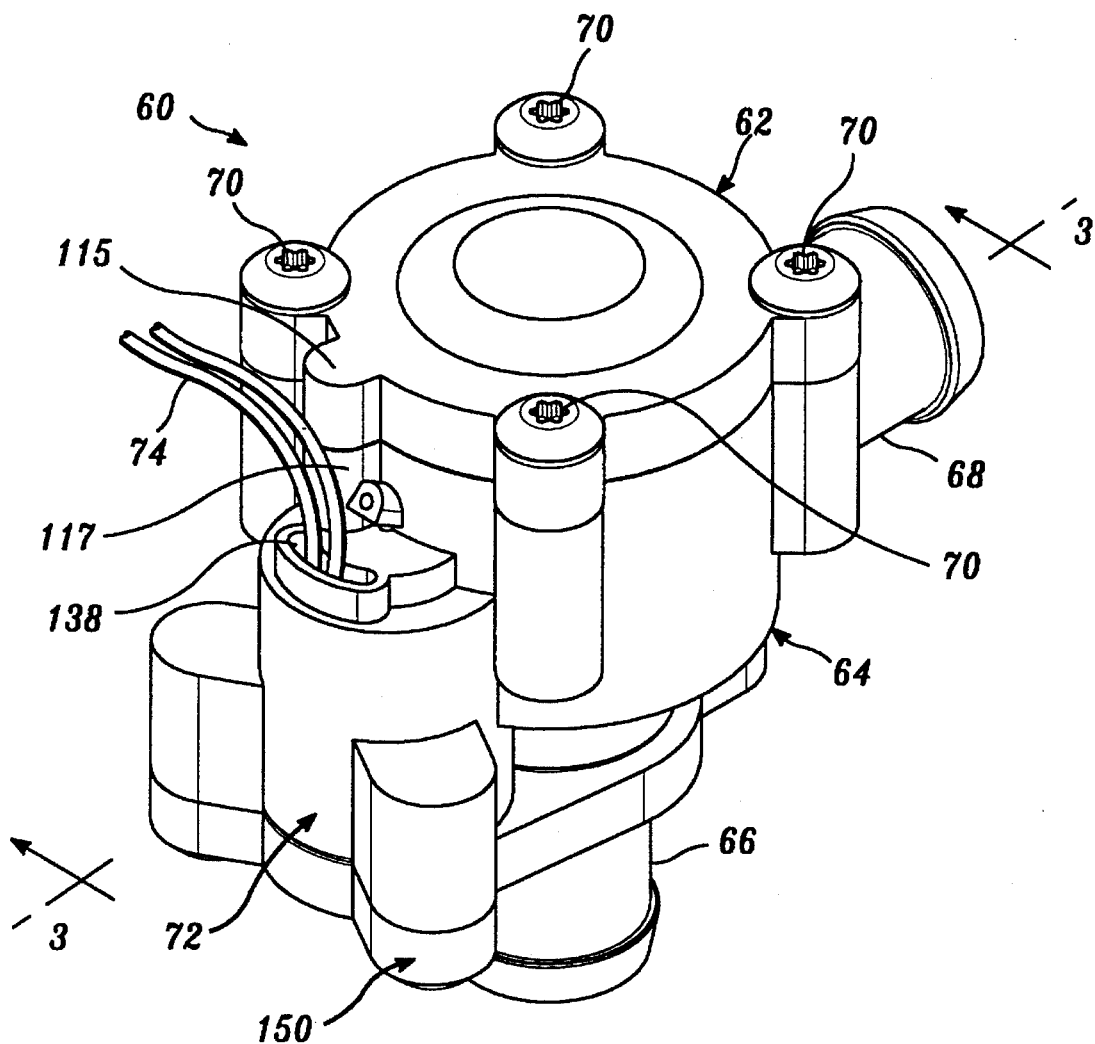
FIG. 2 is a perspective view of an embodiment of a two-way fluid control valve formed in accordance with this invention.

FIGS. 2–12 illustrate the presently preferred embodiment of a two-way fluid control valve 60 formed in accordance with the invention. The two-way fluid control valve 60 illustrated in FIGS. 2–12 includes a cylindrical engine coolant inlet 66 and outlet 68. Both the inlet 66 and the outlet 68 include cylindrical flanges that help to maintain coolant hoses (not shown) attached to the inlet and the outlet. The control valve 60 also includes a lower housing 64 that has a built-in solenoid housing 72, an upper housing 62 that is attached to the lower housing 64 by fasteners such as bolts 70, and a solenoid retaining bracket 150 that attaches to the bottom of the lower housing 62 and maintains a solenoid 110 (FIGS. 3 and 12) in the solenoid housing 72 (FIG. 2). The bolts 70 extend through the thickness of the upper housing 62 and are threaded into aligned, threaded holes in the lower housing 64. The solenoid is electrically connected to an exterior HVAC temperature control system (not shown) through an electrical cable 74 that passes through a hole 138 (FIG. 2)in the solenoid housing 72.

Figure 3:
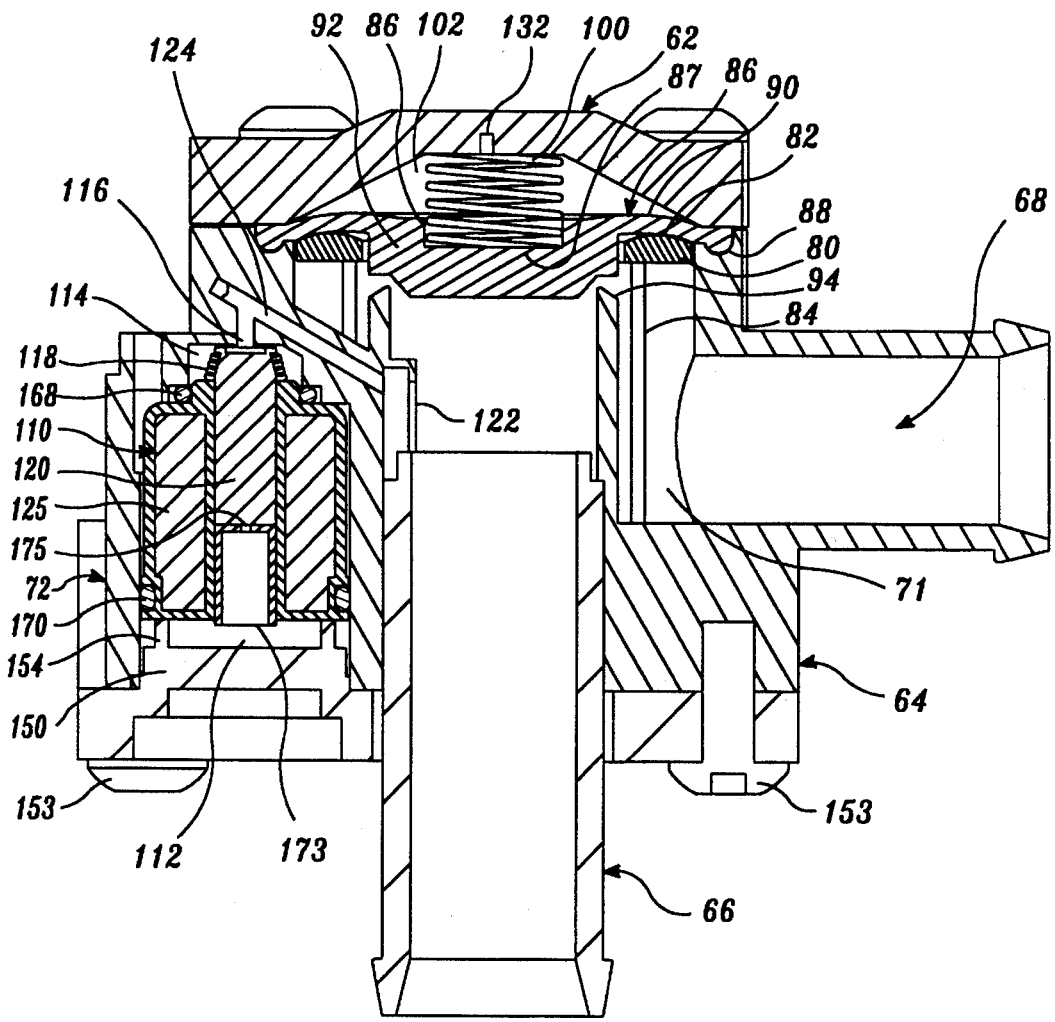
FIG. 3 is a cross-sectional view of the two-way fluid control valve of FIG. 2 along line 3—3 of FIG. 2.

As best seen in FIG. 3, the inlet 66 is formed as a separate piece and is press fit in a correspondingly sized opening in the lower housing 64. The outlet 68 is formed as an integral part of the lower housing 64. Engine coolant flows into the control valve 60 through the inlet 66 and out of the control valve 60 through the outlet 68. The flow of engine coolant through the control valve is controlled by a valve member, formed of a flexible circular diaphragm 86, best seen in FIGS. 3 and 5. Alternate embodiments could use diaphragms of other shapes and sizes. Still other embodiments could use rigid or piston type valve members.

The diaphragm 86 includes a beaded peripheral edge 88 (FIG. 5) that fits within a corresponding groove 89 (FIG. 7) in the top edge of the lower housing 64. The peripheral edge 88 is sandwiched between the upper edge of the lower housing 64 and the lower surface of upper housing 62 (FIGS. 3 and 4) to form a fluid seal between the lower housing and the diaphragm and the upper housing and the diaphragm. The upper housing includes a conical bottom 130 (FIG. 4) that, in combination with the upper surface of the diaphragm 86, form a pressure chamber 102 (FIG. 3) above the diaphragm. The diaphragm 86 also includes a cylindrical center section 92 that extends downward from the center of the diaphragm and is sized to mate with a cylindrical valve seat 94 (FIGS. 3 and 7) located at the top of the inlet 66. The center section 92 contacts and forms a fluid seal with the valve seat 94 when the control valve 20 is in a closed position in which engine coolant is prevented from flowing between the inlet 66 and the outlet 68. FIG. 3 shows the control valve in an open position in which engine coolant is free to flow through the valve, as described below.

Figure 7:
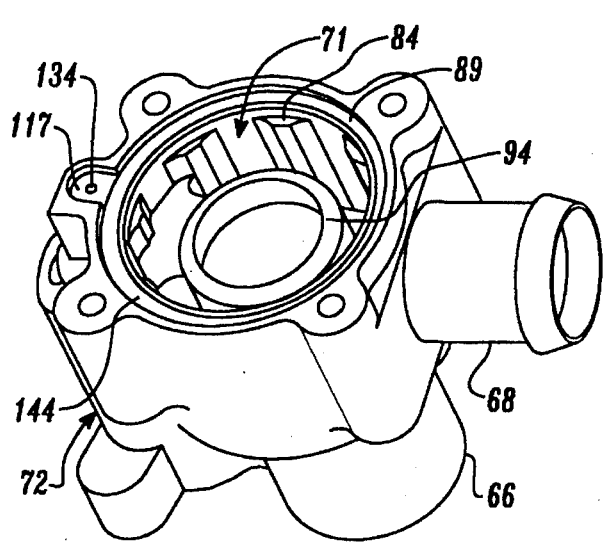
FIG. 7 is a perspective view of the lower housing of the two-way fluid control valve of FIG. 2.
Figure 6:
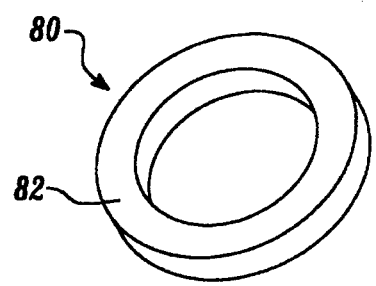
FIG. 6 is a perspective view of the diaphragm support ring of the two-way fluid control valve of FIG. 2.
Figure 9:
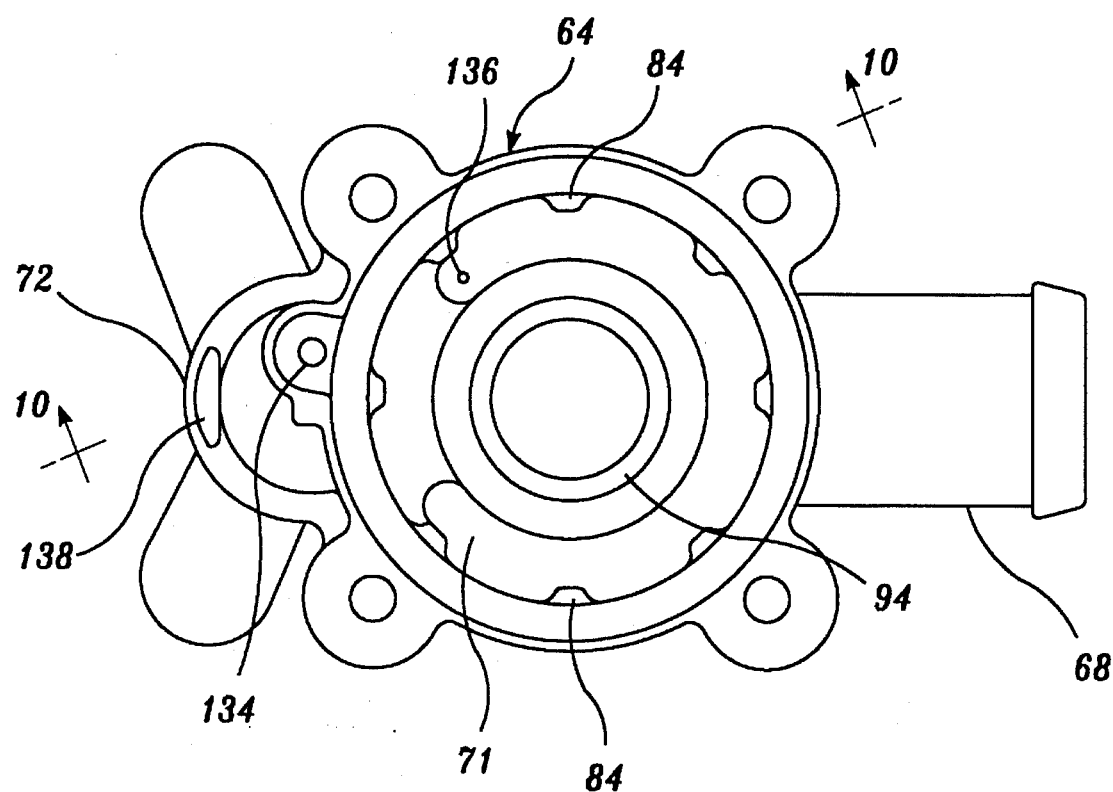
FIG. 9 is a top plan view of the lower housing of the two-way control valve of FIG. 2.

The top of the diaphragm 86 includes a recess 87 (FIG. 3) that is sized to receive the lower end of a biasing member formed by coil spring 100. The coil spring 100 extends upwardly from the recess 87, terminating at the upper housing 62. The coil spring 100 biases the diaphragm 86 into a closed position in which the center section 92 is pressed against the valve seat 94 to form a fluid seal. The diaphragm also includes a flexible middle portion 90 (FIG. 5) that allows the center section 92 to move up or down relative to the valve seat 94. The middle portion 90 is prevented from excessive downward movement by a cylindrical support ring 80 (FIGS. 3 and 6) that includes a curved top 87 that is located adjacent the lower surface of the middle portion 90. The support ring 80 is prevented from moving downward into a cylindrical cavity 71 in the lower housing 64 that surrounds the valve seat 94 by a plurality of support shoulders 84. The support shoulders 84 are located around the circumference of the cavity 71 and extend radially outward from the wall of the cavity 71 (FIGS. 7 and 9).

The fluid pressure within the pressure chamber 102 is controlled by a solenoid 110 (FIG. 12) that is located within the solenoid housing 72 as best seen in FIG. 3. As explained above during the discussion of the schematic representation of the invention shown in FIG. 1, if the fluid pressure within the pressure chamber 102 is the same as or greater than the fluid pressure in the fluid inlet 66, the diaphragm 86 is forced downward by the coil spring 100 to form a fluid seal on the inlet seat 94. If the pressure in the fluid inlet 66 is sufficiently greater than the pressure within the pressure chamber 102, the biasing force of the coil spring 100 is overcome and the diaphragm 86 is pushed upward, off of the inlet seat 94, as shown in FIG. 3, allowing engine coolant to flow over the inlet seat 94 into the cylindrical cavity 71 and out of the outlet 68.

In a manner similar to that described with respect to the schematic representation of FIG. 1, a normally closed port 116 (FIG. 3) of the solenoid 110 is in fluid connection with the inlet 66, a normally open port 175 is in fluid connection with the outlet 68 and a common port 114 (FIG. 3) is in fluid connection with the pressure chamber 102.

The normally closed port 116 (FIGS. 3 and 11) extends upwardly from the top surface of the interior of the solenoid housing 72 until it intersects and into a fluid passageway 124. The fluid passageway 124 slopes downwardly from the intersection with the normally closed port 116 through the body of the lower housing 64 and ends at the inlet 66 directly behind a filter screen 122 (FIG. 3). The filter screen 122 prevents foreign objects from entering the fluid passageway 124 thus preventing the fluid passageway 124 from being plugged by foreign objects.

Figure 10:
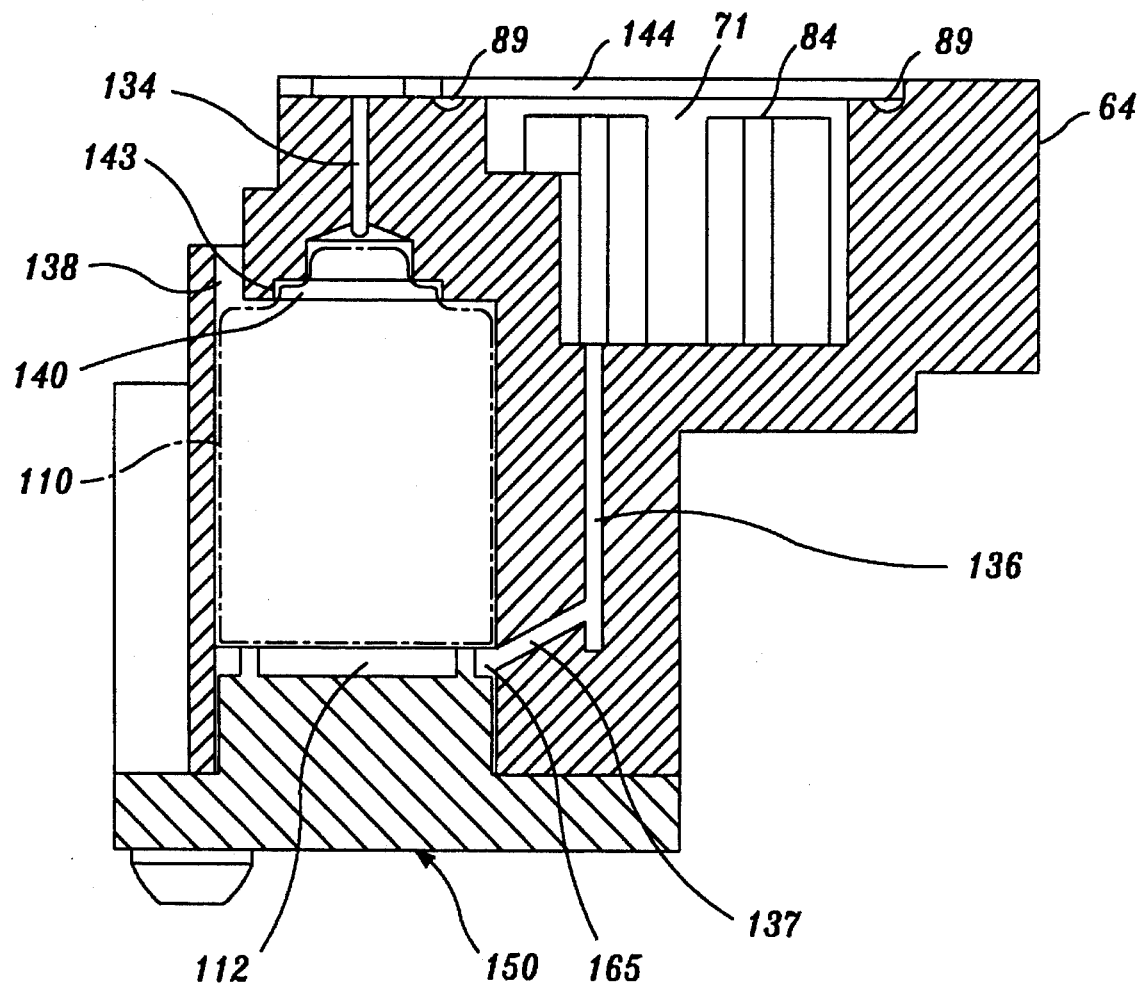
FIG. 10 is a cross-sectional view of the lower housing and solenoid cap along line 10—10 of FIG. 9.
Figure 11:
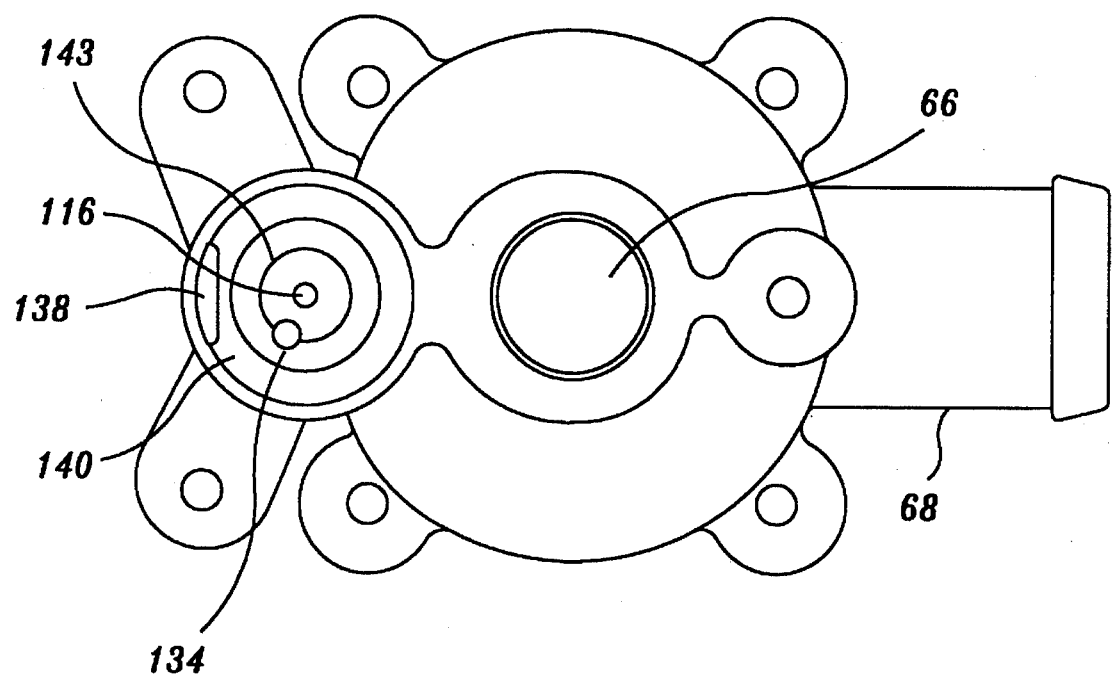
FIG. 11 is bottom view of the lower housing.
Figure 12:
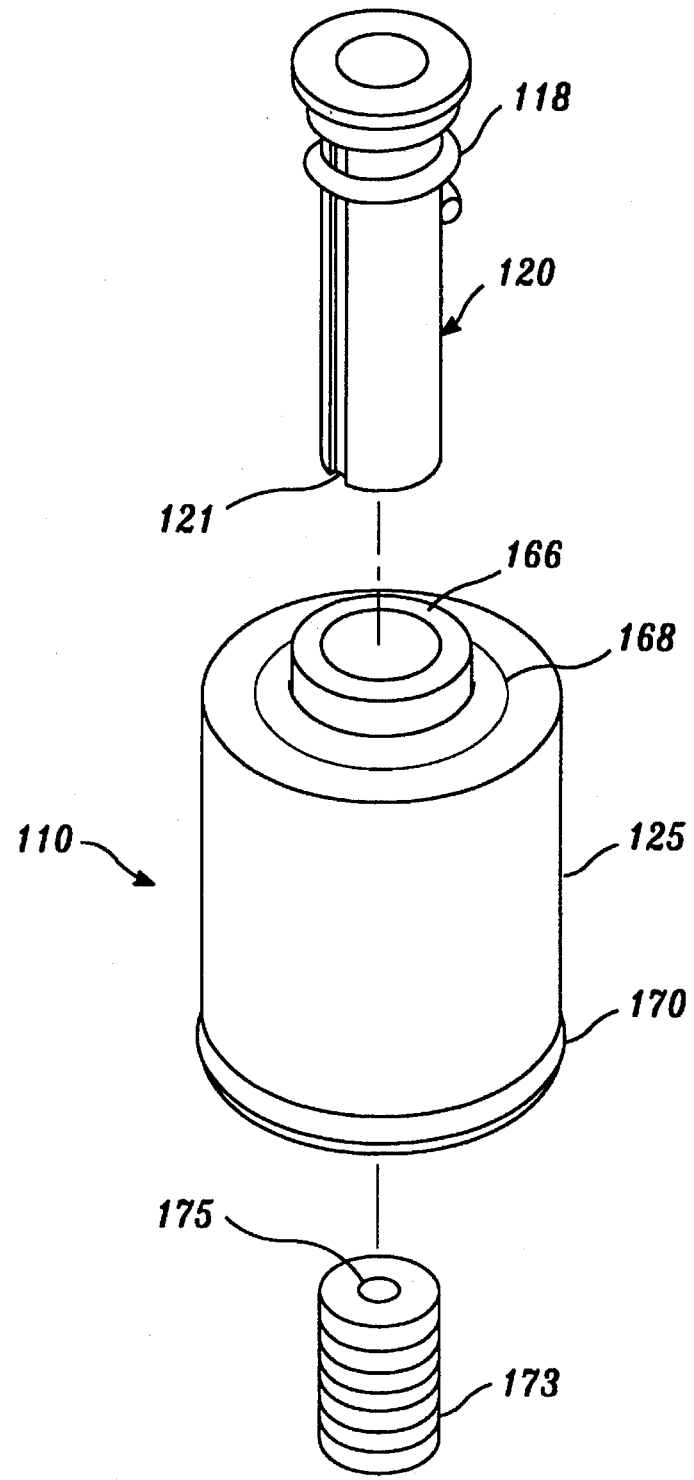
FIG. 12 is a partially exploded view of the solenoid used in the two-way control valve of FIG. 2.

The pressure chamber 102 is connected to the common port 114 (FIGS. 3 and 11) by a groove 132 (FIG. 4) formed in the conical surface 130 of upper housing 62. The groove 132 extends from the center of the upper housing 62 radially outwardly to an ear 115 that extends out from one side of the housing. The location of the ear 115 on the upper housing 62 corresponds to the location of a mating ear 117 on the lower housing 64 when the upper and lower housings are joined, as best seen in FIG. 2. The groove 132 is in fluid connection with a fluid passageway 134 (FIGS. 7 and 10) that extends downwardly through a hole 91 in the diaphragm 86 and through the body of the lower housing 64 (FIG. 5) when the upper housing, diaphragm and lower housing are assembled. The passageway 134 extends downward through the body of the lower housing 64 and opens into the interior of the solenoid cavity 165 (FIG. 10) at the common port 114 (FIGS. 3 and 11 ).

The outlet 68 is in fluid connection with the normally open port 175 (FIG. 3) through a fluid passageway 136 (FIGS. 9 and 10) that extends downward from the bottom of the cylindrical cavity 71. The fluid passageway 136 extends downward into the lower housing 64 and intersects and opens into a second passageway 137 (FIG. 10). The passageway 137 extends diagonally downward from the passageway 136 through the lower housing 64 into a cavity 165 (FIG. 10) of the solenoid housing located directly below the lower edge of the solenoid 110 (shown in phantom in FIG. 10). The cavity 165 is in turn in fluid connection with a fluid chamber 112 below the solenoid 110 (FIG. 3) through castling 154 (FIG. 8) formed in the solenoid cap 150. The fluid chamber 112 is in fluid connection with the normally open port 175.

The solenoid 110 (FIG. 12) is generally cylindrical and includes a cylindrical valve member 120 that slides within a cylindrical hole in the center of the solenoid coil 125. The solenoid 110 also includes a normally open seat 173 (FIGS. 3 and 12) that is threaded into the lower portion of the cylindrical hole in the solenoid. The valve member includes one or more longitudinal fluid channels 121 that extend from the top of the valve member 120 down the sides of the valve member to the bottom of the valve member. The fluid channels 121 allow fluid to flow through the center of the solenoid 110 to the normally open port 175. A spring 118 is attached to the top of the valve member 120 and is coiled around the valve member 120 such that it contacts the upper seat 166 of the solenoid 110 when the valve member is placed within the cylindrical hole in the center of the solenoid coil 125. The coil spring 118 biases the valve member 120 upwardly away from the solenoid coil 125 into contact with the normally closed port 116 when the solenoid 110 is not energized.

Energizing the solenoid 116 moves the valve member 120 downward against the bias of the spring 118 opening the normally closed port 116 and causing the valve member 120 to fore a fluid seal on the normally open seat 173, thus closing the normally open port 175.

The solenoid 110 also includes an upper O-ring gasket 168 located around the top of the solenoid and a lower O-ring gasket 170 located around the bottom of the solenoid. In alternate embodiments, solenoids of other shapes and sizes could be used. In yet other embodiments solenoids using other types of valve members such as diaphragms or reed valves could be used.

Figure 8:
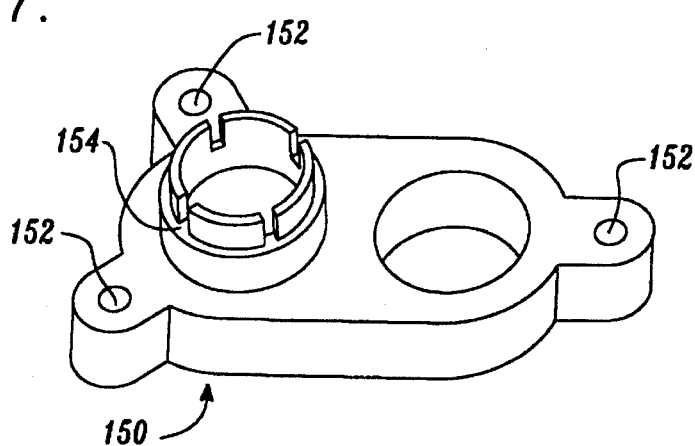
FIG. 8 is a perspective view of the top of the solenoid cap of the two-way fluid control valve of FIG. 2.

The solenoid 110 is placed within the cavity 165 (FIG. 10) of the solenoid housing 72 such that the O-ring gasket 168 (FIGS. 3 and 12) establishes a fluid seal between the upper portion 143 of the cavity 163 and the solenoid 110. The lower O-ring gasket 170 (FIGS. 3 and 12) establishes a fluid seal between the bottom of the solenoid 110 and the surface of the cavity 165 as best seen in FIG. 3. The solenoid 110 is held within the interior cavity 165 of the solenoid housing 72 by a solenoid cap 150 (FIGS. 3 and 8). The solenoid cap 150 includes a castled portion 154 that extends upward from the body of the solenoid cap into the cavity 165 and contacts the bottom of the solenoid 110 thus maintaining it in position within the cavity 165. The solenoid cap 150 is held in place on the lower housing 64 by fasteners such as bolts 153 that extend through holes 152 in the solenoid cap and are received in corresponding holes in the lower housing 64.

Figure 4:
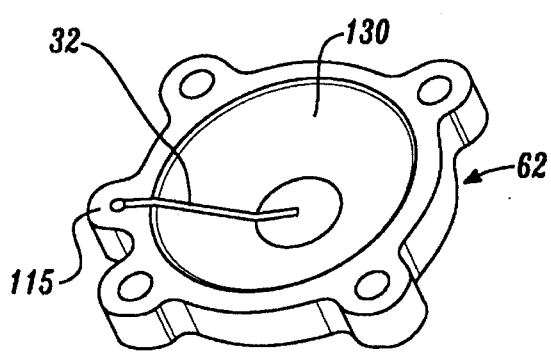
FIG. 4 is a perspective view of the bottom of the upper housing of the two-way fluid control valve of FIG. 2.
Figure 5:
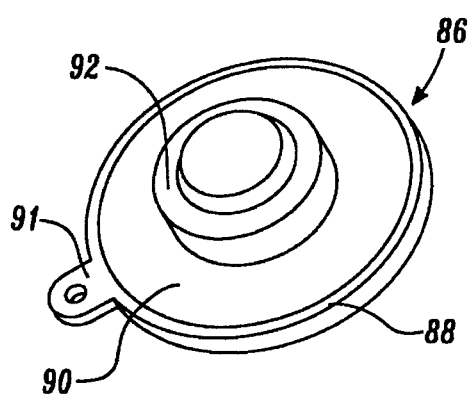
FIG. 5 is a perspective view of the diaphragm of the two-way fluid control valve of FIG. 2.

In operation, when the solenoid 110 is not energized as shown in FIG. 3, the normally closed port 116 is sealed by the valve member 120 and the pressure chamber 122 is in fluid connection with the outlet 68. Fluid from the outlet 68 flows into the cavity 71, downward through the fluid passageways 136 and 137 (FIG. 10), through the castling 154 (FIG. 8), into the chamber 112, through the normally open port 175 (FIG. 3), upward through the channels 121 (FIG. 12)in the valve member 120 (FIG. 12), upward through the common port 114 and fluid passageway 134 (FIG. 10), and into the pressure chamber 102 through the groove 132 (FIG. 4). Therefore, when the solenoid is not energized the interior of the pressure chamber 102 is at the same pressure as the outlet 68. The pressure in the outlet is lower than the pressure in the inlet 66, causing the pressure differential across the diaphragm to move the diaphragm upward, allowing engine coolant to flow through the control valve 60, as shown in FIG. 3.

When the solenoid 110 is energized, the valve member 120 moves downward against the bias of the spring 118 opening the normally closed port 116 closing the normally open port 175 and allowing engine coolant from the inlet 66 to flow through the filter screen 122, up through fluid passageway 124, down through the normally closed port 116 and into the common port 114 (FIGS. 3 and 11). The engine coolant then flows upward through the common port 114 (FIG. 3), the fluid passageway 134 (FIG. 10) and into the pressure chamber 102 through the groove 132 (FIG. 4). When the solenoid 110 is energized, the pressure chamber 102 is at the same pressure as the inlet 66. Because there is no pressure differential across the diaphragm 86, the spring 100 biases the diaphragm downward to form a fluid seal on the inlet seat 94, thus prevent coolant from flowing through the control valve 60.

If electrical power is lost or the HVAC temperature control system (not shown) breaks down, the valve 60 remains in an open configuration in which engine coolant is free to flow through the valve thus maintaining the HVAC system in a full hot position.

In alternate embodiments, if it is desired that the control valve 60 remain in a closed position when the solenoid is not energized, the outlet 68 may be connected to the normally closed port and the inlet 66 may be connected to the normally open port through alternate passageways (not shown). In other alternate embodiments, the shapes, sizes and paths taken by the various fluid passageways could be changed without departing from the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A two-way fluid control valve for an HVAC unit, the control valve comprising:
    (a) upper and lower housings that include a fluid inlet and a fluid outlet;
    (b) a flexible diaphragm valve member located between the fluid inlet and the fluid outlet, the valve member being movable between an open position in which fluid may flow between the fluid inlet and the fluid outlet and a closed position in which the valve member prevents fluid from flowing between the fluid inlet and the fluid outlet, the valve member being biased into the closed position by biasing means that extends between the upper housing and the valve member, the diaphragm valve member including a peripheral edge that forms a seal between the upper and lower housings, a thickened center section, and a flexible middle section that extends between the peripheral edge and the center section; and
    (c) a three-way solenoid that directly controls the movement of the valve member between the open and closed positions, the solenoid including a normally closed port, a normally open port, and a common port, the fluid inlet being in fluid connection with one of the normally closed port and the normally open port, the fluid outlet being in fluid connection with the other of the normally open port and the normally closed port, and a pressure chamber adjacent one surface of the valve member being in fluid connection with the common port.

2. The control valve of claim 1, further comprising a filter located between the inlet and said one of the normally open port and said normally closed port.

3. A two-way control valve for an HVAC unit, the control valve comprising:
    (a) an upper housing and a lower housing that are joined to form a fluid inlet and a fluid outlet;
    (b) a flexible diaphragm valve member located between the upper and lower housings and between the fluid inlet and the fluid outlet, the upper housing and the valve member forming a pressure chamber located adjacent one surface of the valve member, the valve member forming a fluid seal between the upper housing and the lower housing, the valve member being movable between an open position in which fluid may flow between the fluid inlet and the fluid outlet, and a closed position in which the valve member prevents fluid from flowing between the fluid inlet and the fluid outlet;
    (c) a cylindrical support ring located between the diaphragm valve member and the lower housing and positioned to prevent excessive deflections of the valve member during operation of the control valve;
    (d) biasing means located in the pressure chamber and extending between the upper housing and the valve member to bias the valve member into the closed position; and
    (e) a three-way solenoid that controls the movement of the valve member between the open and closed positions, the solenoid including a normally closed port, a normally open port, and a common port, the fluid inlet being in fluid connection with one of the normally closed port and the normally open port, the fluid outlet being in connection with the other of the normally open port and the normally closed port, and the pressure chamber being in fluid connection with the common port.

4. The control valve of claim 3, wherein the valve member further comprises a thickened center section that forms a fluid seal with a valve seat when the valve member is in a closed position, a beaded peripheral edge that forms a seal between the upper and lower housings, and a flexible middle section that extends between the peripheral edge and the center section.

5. The control valve of claim 4, wherein the flexible middle section is supported by the cylindrical support ring.

6. The control valve of claim 3, further comprising a filter interposed between the fluid inlet and said one of the normally closed port and the normally open port.

7. The control valve of claim 5, wherein the lower housing further comprises a plurality of support shoulders that support the support ring.

8. A two-way fluid control valve for an HVAC unit, the control valve comprising:
    (a) upper and lower housings that include a fluid inlet and a fluid outlet, the upper housing including a cylindrical pressure chamber and the lower housing including a cylindrical cavity that is in fluid connection with both the fluid inlet and the fluid outlet;
    (b) a flexible diaphragm valve member located between the upper and lower housings and the pressure chamber and the cylindrical cavity and forming a fluid seal between the upper and lower housings, the valve member also being located between the fluid inlet and the fluid outlet above the cylindrical cavity in the lower housing, the valve member being movable between an open position in which fluid may flow between the fluid inlet and the fluid outlet and a closed position in which the valve member prevents fluid from flowing between the fluid inlet and the fluid outlet, the valve member including a center section that forms a fluid seal with said one of the normally closed port and the normally open port when the valve member is in a closed position, a beaded peripheral edge that forms the seal between the upper and lower housings, and a flexible middle section that extends between the peripheral edge and the center section, the flexible middle section being thinner than the center section.

(c) biasing means located in the pressure chamber and extending between the upper housing and the valve member to bias the valve member into the closed position; and (d) a three-way solenoid that controls the movement of the valve member between the open and closed positions, the solenoid including a normally closed port, a normally open port, and a common port, the fluid inlet being in fluid connection with one of the normally closed port and the normally open port, the fluid outlet being in fluid connection with the other of the normally open port and the normally closed port, and the pressure chamber being in fluid connection with the common port.

9. The control valve of claim 8, further comprising a cylindrical support ring located between the flexible middle section and the lower housing to prevent excessive movement of the middle section during operation of the control valve.

10. The control valve of claim 8, further comprising a filter located between the inlet and said one of the normally open port and the normally closed port.

\* \* \* \* \*

UNITED STATES PATENT AND TRADEMARK OFFICE
CERTIFICATE OF CORRECTION

PATENT NO. : 5,467,960
DATED : November 21, 1995
INVENTOR(S) : J.M. Morris et al.

It is certified that error appears in the above-indentified patent and that said Letters Patent is hereby corrected as shown below:

| COLUMN | LINE | |
|--------|------|---|
| 3 | 5 | "pans" should read --parts-- |
| 3 | 59 | "unfits." should read --units.-- |
| 3 | 66 | "pans" should read --parts-- |
| 5 | 64 | "pans" should read --parts-- |
| 8 | 25 | "fore" should read --form-- |
| 8 | 59 | "12)in" should read --12) in-- |

Signed and Sealed this

Twenty-third Day of April, 1996

Attest:

BRUCE LEHMAN

*Attesting Officer*   Commissioner of Patents and Trademarks